May 22, 1923.
C. P. BROCKWAY
1,456,220
TWO-CYCLE ENGINE FOR BICYCLES
Filed May 29, 1919
3 Sheets-Sheet 1
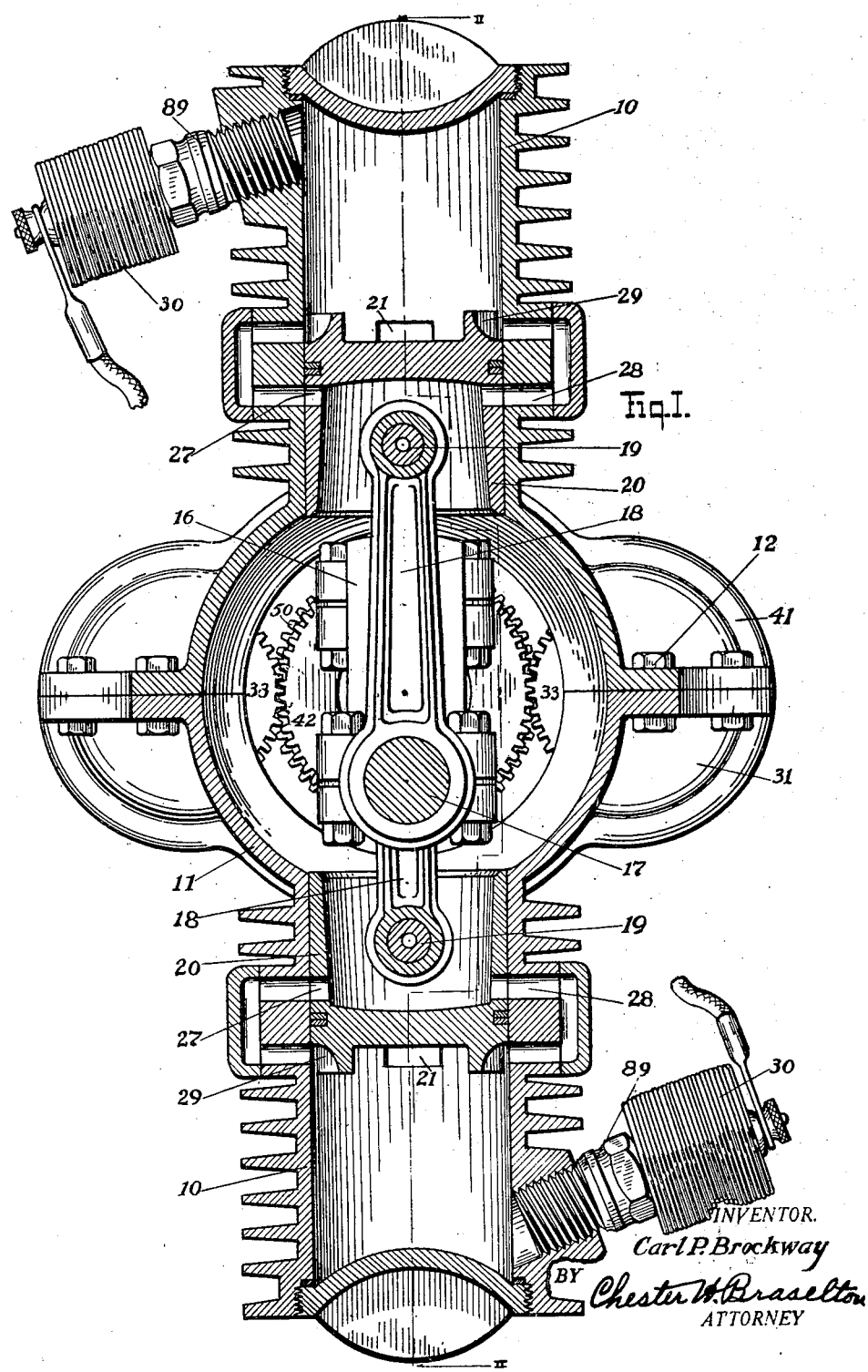
INVENTOR.
Carl P. Brockway
BY Chester W. Braselton
ATTORNEY

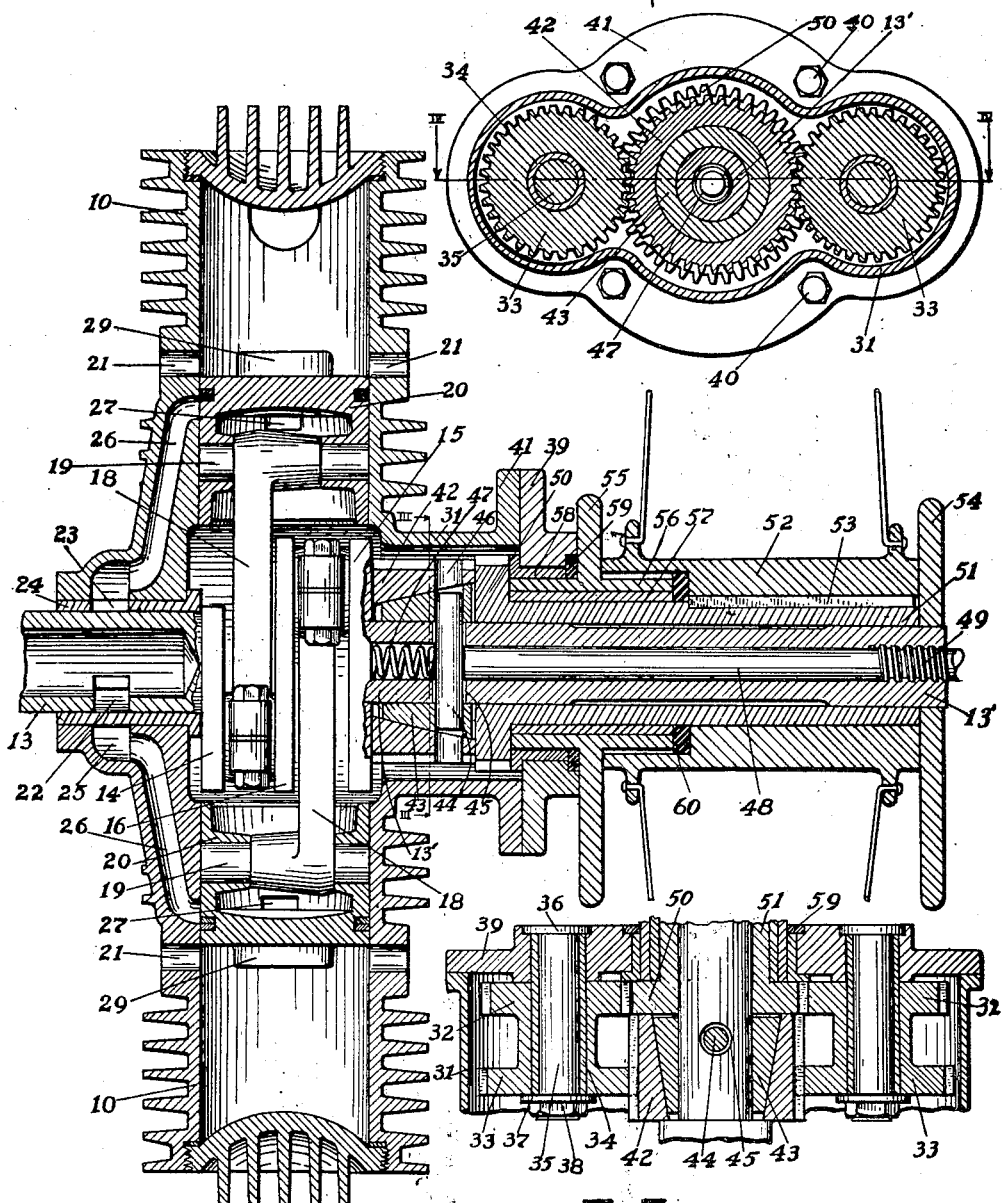

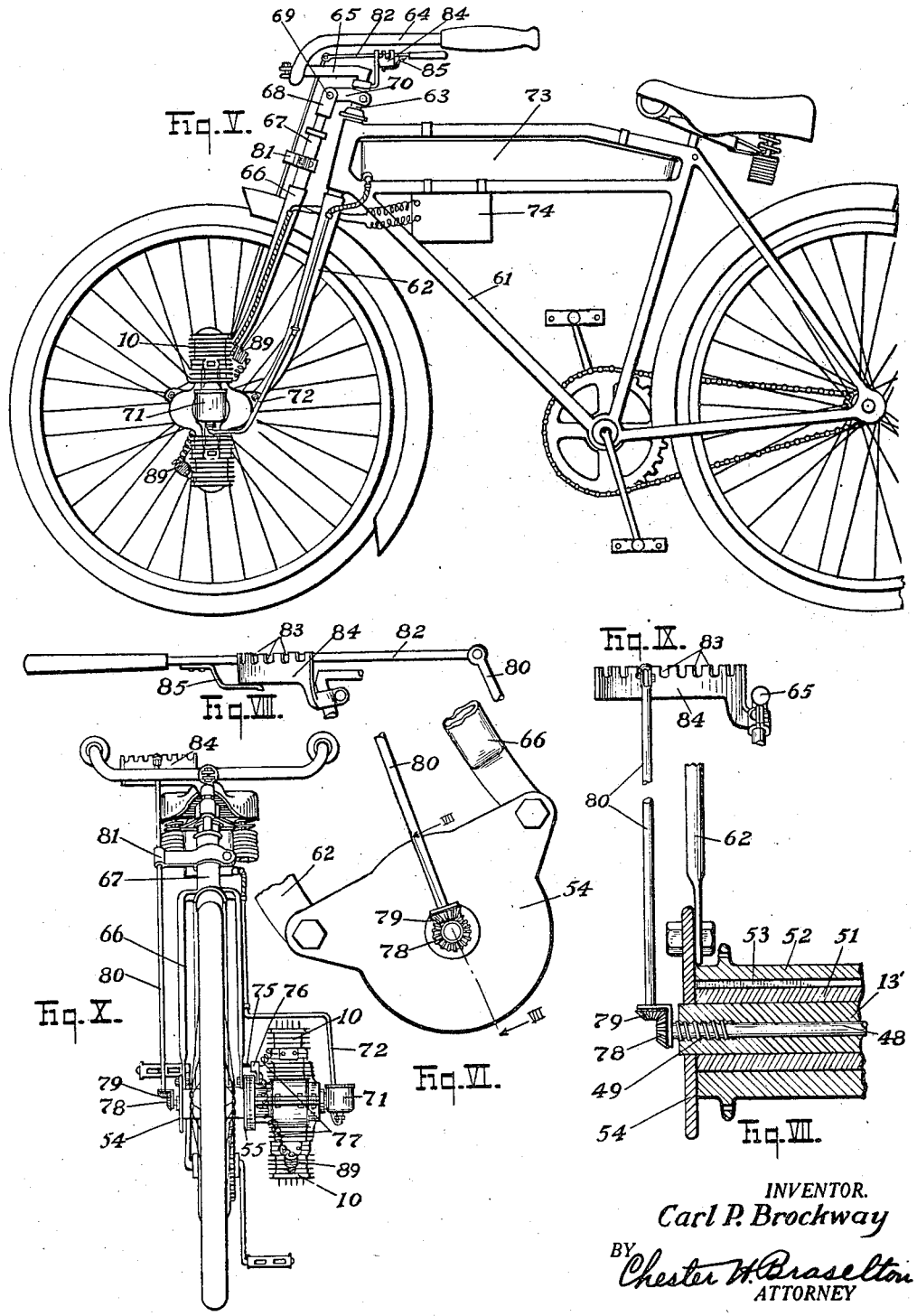

Patented May 22, 1923.

1,456,220

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

TWO-CYCLE ENGINE FOR BICYCLES.

Application filed May 29, 1919. Serial No. 300,655.

*To all whom it may concern:*

Be it known that I, CARL P. BROCKWAY, a citizen of the United States, residing at Toledo, in the county of Lucas and State of Ohio, have invented certain new and useful Improvements in Two-Cycle Engines for Bicycles, of which I declare the following to be a full, clear, and exact description.

This invention relates to improvements in motor-driven bicycles, and particularly to improvements in means for transmitting power from a revolving cylinder engine to the hub of one of the wheels of a bicycle.

One of the objects of the invention is the provision of a suitable mounting for a revolving cylinder gas engine to one side of, and coaxially with one of the wheels of a bicycle.

Another object of the invention is the provision, in connection with such a mounting, of simple and compact reduction gearing, together with a clutch and means operative from the handle bar for throwing the clutch.

Still another object is the provision of a mounting for a rotary gas engine as applied to a road wheel which gives maximum accessibility to the engine and related parts. An object also is to provide a flywheel effect to the road wheel and engine crank shaft by the utilization of the mass of the engine cylinders through rotation of the same.

Other objects, and objects relating to details of construction and economies of manufacture, will appear as I proceed with the description of that embodiment of the invention, which, for the purposes of the present application, I have illustrated in the accompanying drawings, in which:

Figure I is a longitudinal, sectional view of a revolving cylinder engine, which may be employed in carrying out my invention.

Fig. II is a section at right angles to that of Fig. I, taken substantially upon the line II—II. Fig. I and showing, in addition to the engine, the gearing, the clutch and the hub of the bicycle.

Fig. III is a cross section through the gearing taken on line III—III, Fig. II.

Fig. IV is a cross section at right angles to that of Fig. III and upon the line IV—IV of that figure.

Fig. V is a view in side elevation of a bicycle embodying my invention.

Fig. VI is a fragmental detail view showing a portion of the front wheel mounting and part of the clutch operating mechanism.

Fig. VII is a view in section substantially upon the line VII—VII, of Fig. VI.

Fig. VIII is a fragmental, detail view showing the clutch operating handle and means for locking it in adjusted position.

Fig. IX is a fragmental view at right angles to that of Fig. VIII.

Fig. X is a front elevation of a bicycle embodying the invention.

Similar reference characters refer to like parts throughout the views.

In the drawings I have shown a two-cylinder, two-cycle, rotary gas engine of a type similar to that described in my co-pending application Serial Number 288,572, filed April 8, 1919. While only the general characteristics of the engine are of importance in the present case, in the interest of clearness a short explanation of the structure and operation of the engine is necessary.

The cylinders and crank casing are formed in two identical parts, each cylinder 10 being integral with a half of the crank casing 11, the two halves being secured together by bolts 12. The stationary crank shaft, made in two parts 13 and 13' is hollow, for purposes hereinafter to appear. The end cranks 14 and 15 and the intermediate crank 16 carry crank pins 17, upon which are rotatably mounted the inner ends of connecting rods 18. The outer ends of the connecting rods are pivotally mounted upon pins 19 carried by the pistons 20. The exhaust ports 21 are uncovered by the pistons at the inner limit of their movement. Gas is taken into the engine through hollow crank shaft 13 and passes through a port 22 therein, whenever the port 23 in the rotating bushing 24 comes into register. The engine casing is provided at the left, as viewed in Fig. II, with an annular passage 25, which is continuously connected with a pair of passages 26, one in each cylinder wall. The outer ends of these latter passages are uncovered by the pistons when at the outer limit of their motion, at which time gas enters the crank case of the engine. The pistons moving inwardly simultaneously close the passages 26 and cause the charge of gas in the crank case to be retained and compressed.

When the pistons are in their innermost position, where the exhaust of spent gases is taking place, diametrically opposed ports 27 through the apron of the piston just below the piston head, come into register with by-passes 29 extending through the cylinder wall and opening again into the cylinder just above the piston head in its innermost position. Deflecting walls 29 are cast integral with the piston head and are so positioned as to direct the gases entering the cylinder from the by-passes along the cylinder wall, and away from the exhaust ports. Spark plugs 89, which, if desired, may carry induction coils 30, are threaded into the cylinder walls on the sides which are in advance as the cylinders rotate.

The hollow shaft 13' is continued toward the right (in Fig. II) for a considerable distance. The engine casing is also continued to the right for a short distance to form the side of a gear casing 31, the interior of which is open to the crank case of the engine. This gear casing houses a set of epicyclic gears, by means of which the necessary speed reduction is accomplished. Planet gears 32, 33 are made integral and mounted to rotate freely upon a bushing 34 surrounding a stub shaft 35 made in the form of a bolt having a flat head 36 on one end and carrying a washer 37 and nut 38 on the other end. Shaft 35 and bushing 34 are of a size to fit snugly in an opening in a plate 39, constituting the rear wall of the gear casing. This plate is secured by means of bolts 40 to a flange 41 on the casing side member 31. There is a pair of gears 32, 33 in each side of the casing, but as they are identical the description of one will serve for the other.

The sun gear 42 is annular, and constitutes the outer member of a cone clutch, the inner member 43 being slidable upon the hollow shaft 13' and being diametrically perforated to receive snugly a pin 44, which extends through a slightly larger diametrical opening 45 in the hollow shaft. For the purpose of convenience in assembling, the gear 42 is also perforated at 46, so as to permit the pin to be inserted after the clutch elements are in position upon the shaft. A coil spring 47 is arranged within the hollow shaft between the pin 44 and the crank 15, and exerts force upon the pin to normally push the clutch element 43 out of contact with the gear 42. On the side opposite the spring a rod 48 is movably mounted within the hollow shaft and is adapted to shift the pin 44 so as to cause the clutch element 43 to tightly engage the gear 42. The rod 48 is threaded at one side to fit corresponding internal threads upon the shaft 13'.

The second and larger sun gear 50 is integral with a sleeve 51, to which the hub 52 of the bicycle wheel is fastened by a key 53. The hub 52 is mounted between side plates 54 and 55. Plate 54 is provided with a perforation of a size to fit the shaft 13'. The plate 55 however, has a larger opening therethrough which is bounded by a cylindrical element 56 made integral with the plate. Within the element 56 is a cylindrical bushing 57, which constitutes an exterior bearing for the sleeve 51. Surrounding one part of the element 56 is a bushing 58, upon which as a bearing the plate 39 revolves. In order to prevent the leakage of lubricating oil, packing rings 59 and 60 are inserted at the points illustrated in Fig. II of the drawing.

Now, referring to Fig. V of the drawing, the main frame of the bicycle is indicated at 61, and is shown carrying the usual front fork 62, having a center post 63 extending up through the frame, handle bars 64 being bolted to an integral, forwardly bent portion 65 of the center post. The fork 62 is pivotally connected to the rear parts of plates 54 and 55 respectively, while to the front portions of these plates are pivoted the lower ends of an auxiliary fork 66. This fork is made integral with a barrel 67 in which slides a post 68, the lower end bearing upon a coil spring (not shown), in a manner well known in the art. This post 68 is pivoted at 69 to a bracket 70 supported upon the center post 63.

At the end of the hollow shaft 13 is secured a carburetor 71, to which the liquid fuel is led through a tube 72, the lower portion of which is preferably flexible, in order to accommodate itself to the relative motion between the bicycle frame and the front wheel during travel over inequalities in the road. Fuel may be conveniently carried in a fuel tank 73 such as is commonly employed in the art. In Fig. V I have shown a box 74 in which may be carried electric batteries to supply the necessary current for ignition purposes. As both engine cylinders fire simultaneously, and once for each revolution, the timer may consist merely of a fixed contact 75 and a wiping contact 76 carried by the engine, and with which the primary windings of the spark coils upon the spark plugs are connected by wires 77.

The rotation of the clutch operating rod 48 is accomplished by means of a pair of bevel gears 78 and 79, the former mounted upon the projecting end of the rod 48, and the latter upon the lower end of an upwardly extending rod 80, which is slidably supported in a guide 81 clamped upon the barrel 67 of the auxiliary fork. The upper end of the rod 80 has a pivotal connection with an operating arm 82, which is adapted to rest in any one of a series of notches 83, cut into the upper surface of a sector 84, which is supported upon the center post 63.

Near the handle of the arm 82, there is a depending spring finger 85, which engages the under surface of the sector 84 and holds the rod in any adjusted position, but is sufficiently resilient to permit the operator to lift the handle readily and shift the arm as desired. As the rod 80 moves up and down relatively to the main frame of the bicycle during travel over the road, the operating arm 82 rocks upon the sector 84.

In the operation of my invention, the rider turns on the gasoline, releases the clutch by shifting the operating arm 82 in the proper direction, pedals until the bicycle gets up sufficient speed, and then throws in the clutch by shifting the arm 82 to cause the rod 48 to be rotated, so as to move it inwardly. The inner end of the rod 48, by acting upon the pin 44, shifts it inwardly against the pressure of the spring 47. Pin 44 being fixed in the clutch element 43, carries the latter into engagement with the clutch surface of the gear 42, thereby locking that gear to the stationary hollow shaft 13'. Now, as the hub 52 turns, due to the motion of the bicycle, it turns the sleeve 51 carrying sun gear 50. The planet gears 32, being in mesh with the sun gear 50, are thus caused to rotate, and as they are integral with gears 33, which mesh with the locked gear 42, the gear structure 32, 33 runs upon the gear 42 and carries around the gear casing 39, 31 and with it the engine crank case and cylinders. As soon as the engine, thus rotated, begins to fire, power is of course transmitted from the rotating gear casing through gears 33 running upon the locked gear 42 and at a reduced speed through the gears 32 and 50 to the sleeve 51, and hence the wheel hub 52. When the rider desires to stop for a short time only, he releases the clutch, permitting the engine to run free, and applies the coaster brake (not shown) to bring the bicycle to a stop. At this time the sun gear 50 is held still and the planet gears run upon it, thus rotating the gear 42 which is then free to move, the clutch element 43 having been shifted to the right in Fig. II by the spring 47, when the rider moved the rod 48 outward. When the rider desires to start again, the rod 48 is caused to move inwardly, somewhat gradually, thus permitting more or less slippage between the clutch elements and thereby providing smooth starting.

Note should be made of the position of the engine as regards accessibility and also as to the effectiveness of the engine as a flywheel thereby securing to the system a pronounced steadiness of operation.

I am aware that the particular embodiment of my invention above described, and illustrated in the accompanying drawings, is susceptible of considerable variation without departing from the spirit thereof, and therefore I desire to claim my invention broadly as well as specifically as indicated by the appended claims.

I claim as my invention:

1. In a motor driven bicycle, a fixed shaft, a gas engine having revolving cylinders and a revolving crank case mounted to revolve around said shaft, a wheel hub also mounted to rotate around said shaft, and a train of gears, through which said hub is adapted to be driven by said engine, said train of gears being enclosed within said crank case.

2. In a motor driven bicycle, a rotating cylinder gas engine, a fixed crank shaft for said engine extended laterally upon one side beyond the engine casing whereby the weight of the engine is supported by said shaft acting as a cantilever, a wheel hub rotatably mounted upon said shaft at the side of the engine, and reduction gearing adapted to transmit motion from said engine to said wheel hub.

3. In a motor driven bicycle, a revolving cylinder gas engine, a fixed crank shaft for said engine extending laterally upon one side beyond the engine casing whereby the weight of the engine is supported by said shaft acting as a cantilever, a wheel hub rotatably mounted upon said shaft at the side of the engine casing, and epicyclic reduction gearing adapted to transmit motion from said engine to said wheel hub.

4. In a motor driven bicycle, a revolving cylinder gas engine, a fixed hollow crank shaft for said engine extending laterally upon one side beyond the engine casing, a wheel hub rotatably mounted upon said shaft at the side of the engine casing, gearing adapted to transmit motion from said engine to said wheel hub, a clutch adapted to render said gearing operative, and means comprising an element within said hollow shaft for throwing said clutch.

5. In a motor driven bicycle, a revolving cylinder gas engine, a fixed crank shaft for said engine extending laterally upon one side beyond the engine casing, a wheel hub rotatably mounted upon said shaft at the side of the engine casing, epicyclic gearing comprising a sun gear rigid with said hub, a sun gear capable of rotation about said shaft, and a set of planet gears mounted to revolve with said engine casing, and means for locking said last named sun gear to said shaft.

6. In a motor driven bicycle, a revolving cylinder gas engine, a fixed hollow crank shaft for said engine extended laterally upon one side beyond the engine casing, a wheel hub rotatable upon said shaft at the side of the engine casing, epicyclic gearing comprising a set of planet gears mounted to revolve with said engine casing, a sun gear fixed to said hub and a second sun gear capable of rotary motion around said shaft, a clutch for locking said second sun gear to the shaft, and means for operating said clutch including a longitudinally slidable element contained within the hollow shaft.

7. In a motor driven bicycle, a revolving cylinder gas engine, a fixed hollow crank shaft for said engine extended laterally upon one side of the engine casing, a wheel hub rotatable upon said shaft at the side of the engine casing, epicyclic gearing comprising a set of planet gears mounted to revolve with said engine casing, a sun gear fixed to said hub and a second sun gear capable of rotary motion around said shaft, a clutch for locking said second sun gear to the shaft, and means for operating said clutch including a rod within the hollow shaft and co-operating screw threads upon said rod and shaft, whereby the rotation of said rod produces longitudinal movement thereof.

8. In a motor driven bicycle, a revolving cylinder gas engine, a fixed hollow crank shaft for said engine extended laterally upon one side beyond the engine casing, a wheel hub rotatable upon said shaft at the side of the engine casing, epicyclic gearing comprising a set of planet gears mounted to revolve with said engine, a sun gear fixed to said hub and a second sun gear capable of rotary motion around said shaft, a clutch for locking said second sun gear to the shaft, means for operating said clutch comprising a rod within the hollow shaft and co-operating screw threads upon said rod and shaft, whereby rotation of said rod produces longitudinal movement thereof, and means mounted upon the bicycle within the reach of the hand of the rider for rotating said rod.

9. In a motor driven bicycle, a revolving cylinder gas engine, a fixed hollow crank shaft for said engine extended laterally upon one side beyond the engine casing, a wheel hub rotatably mounted upon said shaft at the side of the engine casing, gearing adapted to transmit motion from said engine to said wheel hub, a clutch adapted to render said gearing operative, means for throwing said clutch comprising a rod within said shaft and co-operating screw threads upon said rod and shaft, whereby the rotation of the rod produces longitudinal movement thereof.

10. In a motor driven bicycle, a revolving cylinder gas engine, a fixed hollow crank shaft for said engine extended laterally upon one side beyond the engine casing, a wheel hub rotatably mounted upon said shaft at the side of the engine casing, gearing adapted to transmit motion from said engine to said wheel hub, a clutch adapted to render said gearing operative, and means for throwing said clutch comprising a rod within said shaft, and co-operating screw threads upon said rod and shaft, whereby the rotation of said rod produces a longitudinal movement thereof, and means within reach of the rider for rotating said rod.

11. In combination, a bicycle frame, a spring fork assembly pivotally connected to said frame, and a front wheel mounted in said spring fork assembly, a gas engine carried thereby, a clutch for operatively connecting said engine and wheel, clutch operating means including a rod extending upwardly, and a guide for said rod permitting longitudinal movement thereof.

12. In a motor vehicle, an internal combustion engine having revolving cylinders, a revolving crank case, and a fixed crank shaft extending laterally upon one side beyond the engine casing, a wheel rotatably mounted upon the extension of said shaft, a train of gears whereby said wheel is driven by said engine, all of said gears being enclosed within said revolving crank case.

13. In a motor vehicle, an internal combustion engine having revolving cylinders, a revolving crank case and a fixed crank shaft extending laterally upon one side of said engine, a frame for said motor vehicle in which the extension of said crank shaft is rigidly mounted, a road wheel rotatably mounted upon said crank shaft, transmission gearing whereby said wheel is driven by said engine, a clutch for rendering said gearing operative, all of said gearing and clutch being enclosed by said crank case.

14. In a motor vehicle, an internal combustion engine having revolving cylinders and crank case, a fixed crank shaft rigidly mounted in the frame of said motor vehicle at one side of said engine, a road wheel rotatably mounted upon said fixed shaft, transmission gearing for transmitting motion between said revolving cylinders and said wheel, said gearing being enclosed within the said crank case whereby said gearing is lubricated by the oil within said crank case.

15. In a motor vehicle, an internal combustion engine having revolving cylinders and crank case, a wheel, said engine and said wheel journaled on a relatively stationary crank shaft, transmission gearing comprising a set of planet gears mounted to revolve with said crank case, a sun gear fixed to said wheel, a second sun gear loosely journaled upon said stationary shaft, a clutch for locking said second sun gear to the shaft, all of said gearing and clutch being enclosed within an offset portion of said crank case.

16. In a motor cycle, a road wheel journaled upon a fixed shaft and having a fixed support on each side of the hub of said wheel, a revolving cylinder internal combustion engine mounted upon a fixed crank shaft formed upon an extension of the first mentioned shaft beyond one of its supports, and means for transmitting power from said revolving cylinders to said wheel.

17. In a motor vehicle, a road wheel mounted upon the frame of the vehicle and having fixed supports on each side of the hub of said wheel, an internal combustion engine mounted on a common axis with said wheel and overhung beyond one of said supports, and means for transmitting power from said engine to said wheel.

18. In a motor driven vehicle, a rotary cylinder gas engine, a fixed crank shaft for said engine extending laterally upon one side beyond the engine casing, a wheel hub rotatably mounted upon said shaft at the side of the engine, and reduction gearing adapted to transmit motion from said engine to said wheel hub, said crank shaft being positioned approximately centrally of the engine mass.

In testimony whereof, I affix my signature.

CARL P. BROCKWAY.